(12) United States Patent
Baker et al.

(10) Patent No.: US 10,408,972 B1
(45) Date of Patent: Sep. 10, 2019

(54) SYSTEM AND METHOD FOR LIGHTNING STRIKE PREDICTION AND WARNING

(71) Applicants: Adam Baker, Newnan, GA (US); Jason Deese, Newnan, GA (US)

(72) Inventors: Adam Baker, Newnan, GA (US); Jason Deese, Newnan, GA (US)

( * ) Notice: Subject to any disclaimer, the term of this patent is extended or adjusted under 35 U.S.C. 154(b) by 0 days.

(21) Appl. No.: 15/957,963

(22) Filed: Apr. 20, 2018

(51) Int. Cl.
*G01W 1/00* (2006.01)
*G01W 1/10* (2006.01)
*G08B 21/10* (2006.01)
*G01S 13/95* (2006.01)
*G01W 1/06* (2006.01)

(52) U.S. Cl.
CPC ............. *G01W 1/10* (2013.01); *G01S 13/951* (2013.01); *G01W 1/06* (2013.01); *G08B 21/10* (2013.01)

(58) Field of Classification Search
CPC ......... G01W 1/10; G01W 1/06; G01S 13/951; G08B 21/10
USPC .......................................................... 340/601
See application file for complete search history.

(56) References Cited

U.S. PATENT DOCUMENTS

| | | | | |
|---|---|---|---|---|
| 7,084,775 B1 * | 8/2006 | Smith | ...................... | G01W 1/00 340/601 |
| 7,486,220 B1 * | 2/2009 | Kronfeld | ............... | G01S 13/953 342/26 B |
| 7,558,674 B1 * | 7/2009 | Neilley | .................... | G01W 1/02 702/3 |
| 7,957,902 B2 * | 6/2011 | Karabin | .................. | G01W 1/16 702/4 |
| 9,810,811 B2 * | 11/2017 | Marshall | ................. | G01W 1/10 |
| 2001/0030624 A1 * | 10/2001 | Schwoegler | ............ | G01W 1/10 342/357.52 |
| 2007/0156339 A1 * | 7/2007 | Oettinger | ........... | G01R 29/0842 702/4 |
| 2008/0122424 A1 * | 5/2008 | Zhang | ................ | G01R 29/0842 324/72 |
| 2009/0177343 A1 * | 7/2009 | Bunch | ....................... | G01S 7/22 701/14 |
| 2011/0090111 A1 * | 4/2011 | Stagliano, Jr. | .......... | G01S 7/025 342/26 R |
| 2015/0073710 A1 * | 3/2015 | Deierling | ................ | G01W 1/16 702/4 |
| 2015/0256277 A1 * | 9/2015 | Johnson | .............. | H04L 12/1845 340/601 |
| 2017/0109936 A1 * | 4/2017 | Powderly | ................. | G06F 3/012 |
| 2017/0363773 A1 * | 12/2017 | Ruzanski | ................ | G01W 1/10 |

* cited by examiner

*Primary Examiner* — Naomi J Small
(74) *Attorney, Agent, or Firm* — John L. Sotomayor

(57) ABSTRACT

This document presents a system and method for gathering weather data and utilizing that weather data to calculation the upper and lower limits of the lightning formation range within a thunderstorm or storm system. The calculation may provide a probability for the beginning of lightning formation and lightning strikes for a geographic area for a given time period in sufficient time to permit alerts of lightning activity to be formulated and sent to users of the system. Equally, the system may calculate the probability of the cessation of lightning activity for a given geographic area at a specific time. The probability of both beginning and cessation of lightning activity may be provided at greater than 99% confidence.

20 Claims, 5 Drawing Sheets

US 10,408,972 B1

SYSTEM AND METHOD FOR LIGHTNING STRIKE PREDICTION AND WARNING

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Many lightning detection systems are based upon detection technology utilizing electromagnetic (EMF) disruptions in the atmosphere. This technology, as advanced as it is, can only determine the distance between a user's location and the location of a lightning strike that has already occurred. In addition, because of the numerous sources of EMF in everyday use, filters are typically required to filter out smaller amperage EMF events resulting in also filtering out smaller amperage lighting strikes. This leads to missed lightning strikes and late notification because detection technology must wait for something to occur before issuing a warning. Further, such detection methods must wait up to 30 minutes after a strike has been detected within a warning area, typically set as a circle with a 10 mile radius, to sound an all-clear, which results in a delay in the resumption of outdoor activities or outright cancellation of such activities.

More advanced lightning detection systems may constantly monitor a local environment and focus on predicting whether or not there is enough energy change to create a lightning strike within a defined monitored zone. Every thunderstorm, or line of thunderstorms, produces a unique "electrical footprint" at ground level and it is this electrical footprint where lightning is most likely to occur. The extent and/or shape of this electrical footprint depends upon numerous factors such as season, pressure, wind speed, temperature, elevation, and additional factors. A common gradient to assist in determining the shape and extent of this "electrical footprint" is the map within a thunderstorm, or line of thunderstorms, where the environmental temperature is at −10 Celsius. However, this measure is only about 60% effective in predicting when a lightning strike will occur, and where a lightning strike will occur. Uncertainties with this method include both an inability to detect actual lightning occurrences, as well as falsely indicating the occurrence of lightning when in fact no lightning strikes occur.

BRIEF DESCRIPTION OF THE DRAWINGS

Certain illustrative embodiments presenting organization and method of operation, together with objects and advantages may be best understood by reference to the detailed description that follows taken in conjunction with the accompanying drawings in which.

DETAILED DESCRIPTION

Figure 1:
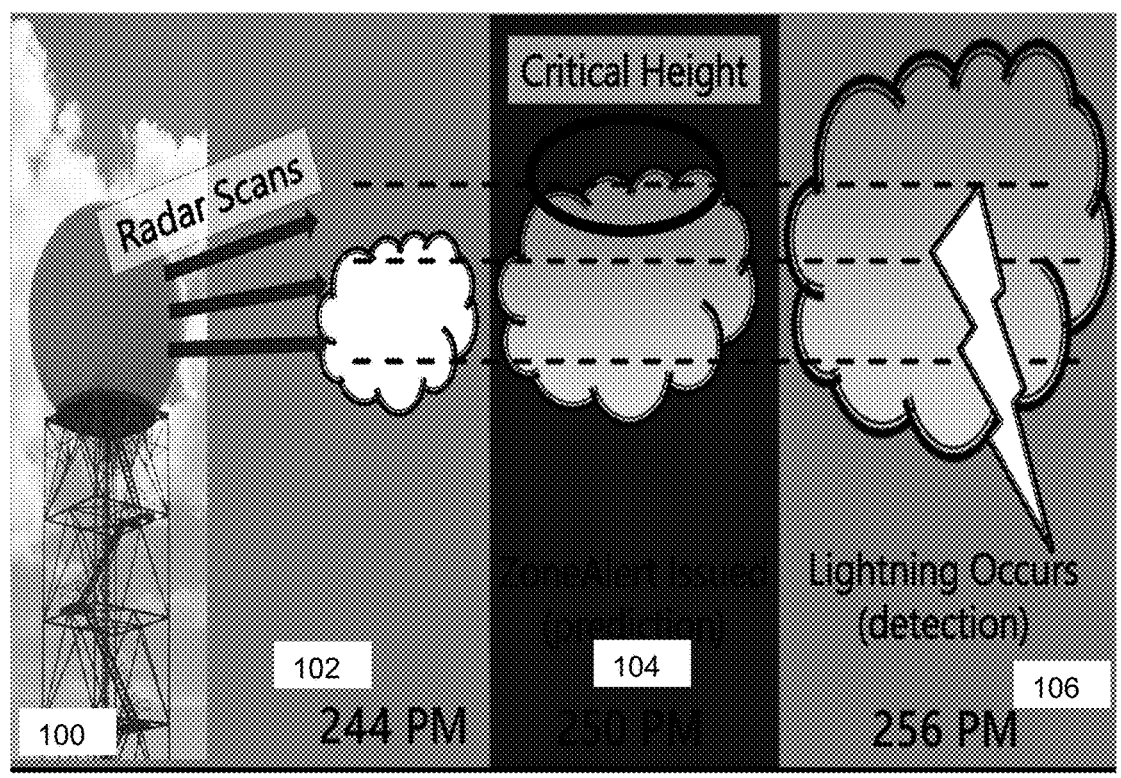
FIG. 1 is a view of the determination of critical height for lightning formation consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

This document presents a system and method for the analysis of thunderstorms to analyze and predict the formation, creation and occurrence of lightning strikes. The system and method herein disclosed may be used primarily for the prediction of cloud to ground lightning strikes, however, it is not limited to simply predicting that set of lightning strikes. The system and method herein disclosed may also be applied to predict cloud-to-cloud lightning strikes, and cloud to structure lightning strikes as well.

Reference throughout this document to "lightning strikes" refers to the development of the electrostatic discharge known as lightning, and further references any type of lightning strike, whether cloud-to-ground, cloud-to-cloud, cloud-to-structure, or any other lightning discharge or strike.

Reference throughout this document to "dBZ" refers to Decibel relative to Z. This parameter is a logarithmic dimensionless technical unit used in weather radar to compare the equivalent reflectivity factor of a radar signal reflected off a remote object to the return of a droplet of rain with a diameter of 1 mm.

Reference throughout this document to a "Measured Elevated Instability Index" refers to a measure of instability in the atmosphere computed by taking the difference between the environmental temperature at a particular level above the ground and the temperature of an adiabatically lifted parcel of air at the same level above the ground. One non-limiting example of a Measured Elevated Instability index is the Lifted Index (LI).

Reference throughout this document to "Convective Updraft Temperature", or CUT, height refers to the critical temperature of the updraft within a developing thunderstorm (usually above the environmental −10 Celsius height). The CUT height varies over location and time, while being sensitive to the measure of atmospheric instability present. This can be approximated from various calculations of instability parameters within observation-adjusted model simulations. One method of such an approximation is taking the sum of (1) the environmental −10 Celsius height in feet above ground level and (2) the product of the absolute value of the Measured Elevated Instability Index multiplied by an Instability Constant (IC), where IC is defined as an environment specific determined constant, measured in feet.

In determining the CUT parameter, the environment conducive to the production of lightning may change over a season and with geographic location. The CUT parameter, therefore, takes into account both seasonal and geographic variations and may be calculated by any of a series of determined formulas.

Reference throughout this document to "Critical Height" refers to the minimum height particles within a developing shower or storm must reach to produce lightning strikes.

Many existing lightning detection systems utilize data analysis on collected strike data in an attempt to predict where the next lightning strike will occur. These attempts have had some small success based upon an analysis of meteorological data associated with storm motion and other atmospheric effects to predict where future strikes will occur based upon past observed strike data. However, storm systems are so complex and the data changes so quickly that these systems are commonly overwhelmed in producing results quickly enough to accurately predict future lightning strikes, or to even analyze the intensification of new growing thunderstorms. Because such storms are the most common type of warm season storm and the data sets are so dynamic, the intensification of the storms is never analyzed at all. As a result the predictive capability for these systems is quite low in terms of percentage probability. In an attempt to make up for the low degree of accuracy, these systems create forecasts over wide geographic areas with descending probabilities as the position moves out from the center of a storm.

Other existing lightning detection systems utilize meteorological data that maps the −10 degree Celsius height gradient of the environment around developing storms and storm systems, which frequently differs significantly from the −10 degree Celsuis height gradient within storm systems. Meteorological research has found that this is a suitable temperature within storm clouds for the formation of lightning. However, such previous research has demonstrated only a 60% success rate in predicting the location of lightning strikes in relation to target locations.

A need exists for a lightning prediction system that can increase the determination of lightning strike locations prior to any strikes occurring and with greater than 60% accuracy.

The instant application provides a lightning prediction system for predicting the onset of lightning strike activity, a range of probabilities for lightning strike activity, and predicting the cessation of lightning strike activity for specific geographic locations. It is understood that the predictions for lightning strike activity for specific geographic locations may change as the conditions for such activity change over time and with motion of weather systems in which lightning may form. However, the probability for lightning strike activity may be calculated and provided for one or more selected geographic locations provided as input to the system. Alternatively, the system may calculate lightning strike predictions for thunderstorms or other weather systems as they move from one geographic location to another and these predictions may be provided to users as real time updates as the weather system changes locations.

In an embodiment, the system may be active to receive meteorological data from radar systems and publicly available weather information sources. Predicting the threat of lightning strike activity begins with a definition of the geographic area with which a user is concerned. The defined geographical area may consist of a central location and the radius of concern surrounding that central location. This geographic central location and radius of distance around that central location is defined as the zone of concern for the user. This zone may be a static zone or may be dynamically updated as the user determines what geographic areas are of concern over time.

In this embodiment, the system may, as an initial position, obtain vertical temperature data from one or more available atmospheric models. A preferred atmospheric model may be specified, however, the atmospheric model may be specified prior to retrieving vertical temperature data from the selected atmospheric model. Utilizing the received temperature data, the system may analyze the data to calculate height ranges for particular parameters of interest within the atmosphere. Critical height ranges include a Lower Bound (LB) temperature range and an Upper Bound (UB) temperature range.

In an embodiment, the LB may be the height range at which the environmental temperature is approximately −10 degrees Celsius. The UB may be the height range that forms the Convective Updraft Temperature (CUT) height. The LB and the UB form the height boundaries, based at least upon temperature, within which the conditions are consistent with the formation of lightning.

In this embodiment the system may then parse individual radar scans for the reflectivity measurements within the LB and UB height ranges in terms of dBZ. The system may then check dBZ value from the individual radar scans with respect to LB and UB against pre-determined dBZ values that indicate that the formation of lightning is a possibility. The system may then perform calculations to determine the probabilities of one or more lightning strikes forming in relation to a particular geographic location. The system may then prepare a series of geo-fence lightning strike probability ranges, where the geo-fenced areas indicate the probability from 0 to 100% and the distance from the center of the geographical area for which that probability applies. Gradients for probabilities are created and a graphical display of the gradients are presented on a display device associated with a user, or can be calculated to be a single probability relative to the user's location where the single probability may form the basis for a notification message in a simpler non-graphical form, where the notification may be provided through text messages, social media, email alerts, or any other form of public and/or private notification.

In this embodiment, upon determination of the lightning probability and the area to which each probability applies, the system may then send one or more users a customized alert of lightning threat.

Because storm systems that generate the possibility of lightning strikes are dynamic and moving systems, the lightning prediction system may enter a monitoring phase after the completion of the initial strike determination for a geographical area. In an embodiment, the lightning prediction system will enter a monitoring phase to continue to calculate probabilities for lightning strikes as the storm system continues to move and change dynamically. The lightning prediction system may continue to receive radar scans of reflectivity as the storm system moves and changes dynamically. The lightning prediction system continues to parse the received radar scans and continues to dynamically update the LB and UB height ranges and compares the updated LB and UB against the previously calculated LB and UB height ranges over a geographic area. The lightning prediction system then dynamically calculates the probability of lightning formation for the updated LB and UB height range values. If the newly calculated lightning formation probabilities have changed to indicate that the probability is more likely, or that the area of lightning formation has moved closer to a geographical area of interest, the lightning prediction system will formulate and transmit additional alerts to one or more users, where the set of users may be the same as that receiving an earlier notification message or may comprise a different set of users based upon the physical location of the storm system.

In an embodiment, the lightning prediction system may be active to not only predict the onset of lightning strike activity, but may also predict the cessation of lightning strike activity as well. As the lightning prediction system continues to monitor the received radar data for LB and UB height ranges, the system continues to monitor the incoming data to determine when dBZ values for the LB and UB ranges decrease below the established threshold criteria and vertically integrated ice abates. Upon determination that the dBZ value has decreased below the threshold for lighting formation, the lightning prediction system checks one or more lightning strike detection networks to determine if there are any continuing lightning strikes being detected and recorded. If all detection networks are clear of lightning within the geographic area, or zone, of interest to the user, the lightning prediction system may then determine that the lightning formation and lightning strike threat has dropped below the probability level for an alert or has ceased altogether. When the lightning formation or lightning strike threat has dropped below a pre-established probability level, or has ceased altogether, the system may be configured to send one or more users a customized alert indicating the cessation of the lightning strike threat for a specified geographical area. The cessation of a lightning strike threat may be designated as a greatly reduced threat, as established by a pre-set low threat boundary probability which, in some situations, may be non-zero.

A system and method is herein disclosed for predicting lightning, composed of at least a device having a processor, display and user input capability. The device receiving a user defined area of concern for lightning strike activity and collecting vertical temperature data for the defined area of concern from one or more weather temperature models. The system operable to calculate critical lower bound height and critical upper bound height for lightning formation.

The system receives radar reflectivity data for the defined area of concern and parsing radar reflectivity from individual radar reflectivity scan data. The system and method associating parsed radar reflectivity with the lower bound height and upper bound height and comparing the parsed radar reflectivity associated with the lower bound height and the upper bound height against a pre-set lighting strike threshold value. If the threshold value is exceeded, formatting at least a lightning strike warning and time until strike warning for the defined area of concern to at least one user and transmitting at least a lightning strike warning and a time until strike warning to the at least one user.

In an embodiment, the lower bound height is associated with the height of environment where the temperature is at or below −10 degrees Celcius and the upper bound height is associated with a convective updraft temperature (CUT) height. The parsed radar reflectivity is measured in dBZ and the lighting strike threshold value associated with the lower bound height and the upper bound height is at or above 40 dBZ or the lightning strike threshold just below said lower bound height is at or above 45 dBZ. When these values are exceeded the lightning strike warning is a warning that lightning strike activity will begin, or when these values drop below the threshold values the lightning strike warning is a message indicating that lightning strike activity will cease.

In an embodiment, the lightning strike warning may include a probability associated with said time until strike warning, where the probability of a lightning strike changes in inverse proportion to the length of time remaining in said time until strike warning. In a non-limiting example, the time until strike warning includes an indication of whether the time until strike is the time until lightning strikes begin or the time until lightning strikes cease for the user defined area of concern. The at least one user may be one or more individuals, a private subscription service, a local government entity, and/or emergency response entities. The lightning strike warning comprises a lightning strike begins message, a lightning strike threat continues message, and/or a lightning strike threat cessation message based upon the type of message in which the user or users have interest.

Turning now to FIG. 1, this figure presents a view of the determination of critical height for lightning formation consistent with certain embodiments of the present invention. In an exemplary embodiment, the lightning prediction system receives radar information from one or more available radar scans 100 and stores the radar scan data in the lightning prediction system server. Radar scan data is associated with a time at which the scan was performed. The radar scan data at a particular time may provide an indication of cloud formation 102 at a particular time of day. The cloud formation 102 may be the beginning of a storm system, thunderstorm, or simply cloud formation in an otherwise clear sky. The lightning prediction system continues to gather radar scan data 100 to review the cloud formation and analyzes cloud formation to determine the speed and height of the cloud formation.

The lightning prediction system reviews the radar scan data to determine whether the particles within a bank of clouds or an intensifying shower or storm, which have a visual aspect as "clouds", have reached a pre-determined critical height for lightning formation 104. At 106, when the clouds have reached a critical formation height lightning may be detected by most systems currently available. The lightning prediction system is active to provide users an indication and alert of lightning formation, the geographic location, the probability of lightning strikes in a given geographic location, and the time when lightning strikes are most likely to occur prior to the actual formation and occurrence of any lightning strikes.

Figure 2:
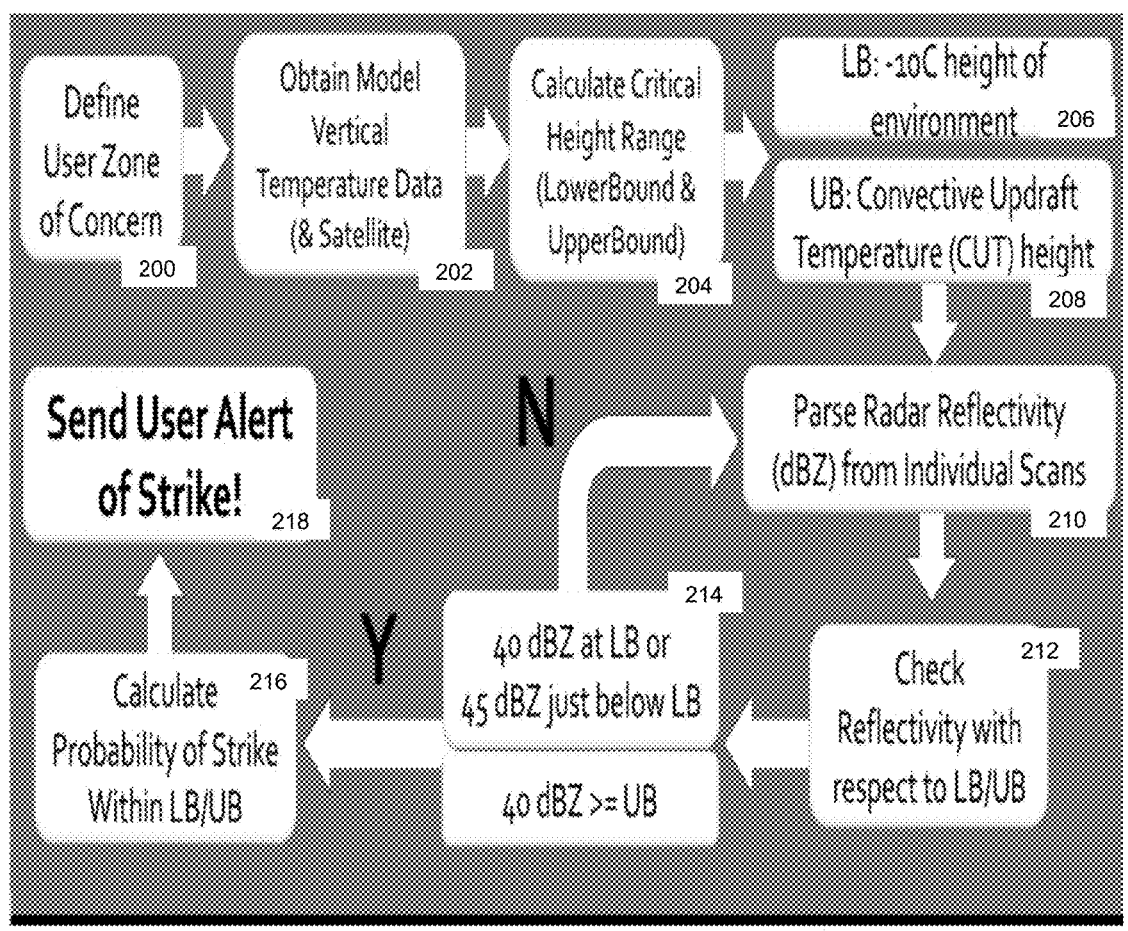
FIG. 2 is a flow diagram for the determination of a first strike prediction consistent with certain embodiments of the present invention.

Turning now to FIG. 2, this figure presents a flow diagram for the determination of a first strike prediction consistent with certain embodiments of the present invention. In an exemplary embodiment, the lightning prediction system utilizes information input from a user and from radar and other data sources to create a first strike prediction, probabilities for geographic strike location and one or more alerts to users based upon the calculated probabilities indicating when and where lighting formation and lightning strikes will occur. In an embodiment, the lightning prediction system receives input from a user to define the zone of concern to the user, where that zone of concern consists of one or more geographic locations 200. The system may then collect model vertical temperature data from one or more sources, which may include data from satellites, radar scans, weather monitoring stations, and other sources at 202. Additionally, temperature data may be received from one or more numerical weather prediction models or analyses based upon combining different sources of temperature information to determine the temperature for a geographic area. The lightning prediction system may then calculate the critical height range for the LB and the critical height range for the UB at 204.

In this embodiment, at 206 the critical height range for the LB is established as the height within the cloud or storm system at which the temperature of the environment is −10 degrees Celsius. At 208, the critical height range for the UB is the calculated height of the Convective Updraft Temperature (CUT). The lightning prediction system may then collect radar data from various radar stations in and surrounding the geographic area of concern. At 210 the lightning prediction system may parse the collected and received radar data to determine the reflectivity from the individual scans as measured in dBZ. At 212, the system checks the reflectivity against a pre-determined and established threshold value with respect to the LB and UB height ranges.

At 214 if the reflectivity measure from the collected radar scan data does not meet the established threshold values for the LB and/or the UB, then the lightning prediction system will continue to parse the radar reflectivity data as it is received. The threshold values may be established at an average of 40 dBZ at the LB height, or 45 dBZ just below the LB height, and at an average of 40 dBZ at the UB height or above the UB height. However, these values are an average and the target thresholds may be adjusted as much as plus or minus 10 dBZ from these values, based upon data received from the computer model output. If the reflectivity measure from the collected radar scan data meets or exceeds the established threshold values for the LB height and at or above the UB height, the lightning prediction system then calculates the probability of a lightning strike occurring between the LB height and the UB height at 216. If the probability of a lightning strike matches or exceeds the probability at which a user wishes to be notified, the lightning prediction system at 218 will formulate and transmit a lightning strike alert to the user. Although a user may establish a probability prediction level, as a percentage, at which they wish to be alerted, the lightning prediction system may spontaneously formulate and transmit a lightning strike alert to any users that are within the geographical area for which the probability prediction level is above a certain percentage value. By way of example and not of limitation, the lightning prediction system could formulate and transmit a lightning strike alert to any users who are within the geographic area at which the lightning strike prediction level is 80% or greater. Lightning strike alerts may be formulated as text messages, email messages, specialized alert messages, emergency alert signals, or any other alert message format that may be sent in real time and be transmitted to a computer system, iPad or other tablet, mobile devices, smart phone, smart watch, any specialized or dedicated alert system, or any other device or system capable of receiving wireless or transmitted alert message or signals.

Figure 3:
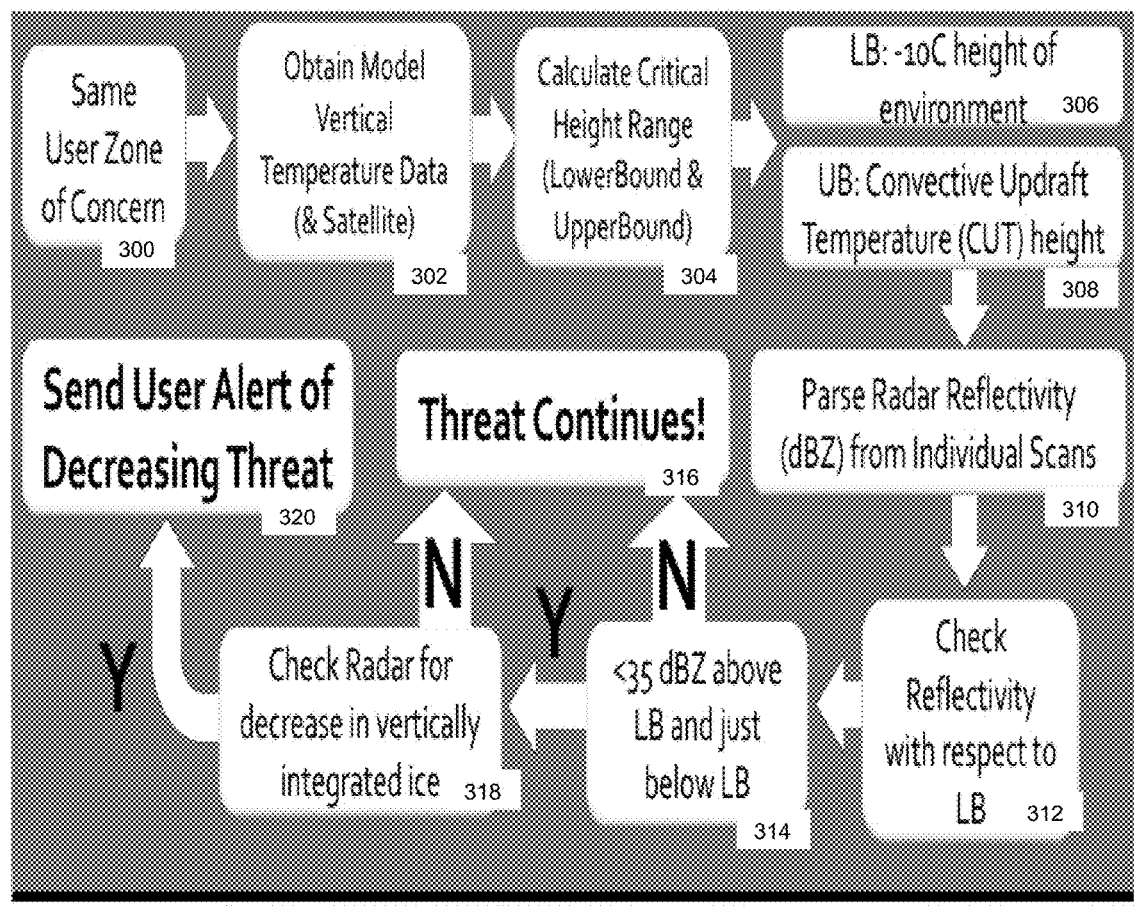
FIG. 3 is a flow diagram for the determination of the cessation of lightning strike possibility consistent with certain embodiments of the present invention.

Turning now to FIG. 3, this figure presents a flow diagram for the determination of the cessation of lightning strike possibility consistent with certain embodiments of the present invention. In an exemplary embodiment, favorable conditions for lightning formation persist over time, and the lightning prediction system may provide an indication of when such conditions dissipate or disappear, providing an indication of the cessation of lightning strikes for a geographical area.

In an embodiment, the lightning prediction system retains one or more zones of concern as input by a user at 300. The lightning prediction system continuously collects model vertical temperature data from one or more sources, which may include data from satellites, radar scans, weather monitoring stations, and other sources such as one or more numerical weather prediction models or analyses at 302. The lightning prediction system may then calculate the critical height range for the LB and the critical height range for the UB at 304.

In this embodiment, at 306 the system dynamically calculates critical height within the cloud or storm system at which the temperature of the environment is −10 degrees Celsius and sets this value as the LB. At 308, the system dynamically calculates the critical height of the CUT and sets this height range as the UB. The lightning prediction system continuously collects radar data from various radar stations in and surrounding the geographic area or zone of concern. At 310 the lightning prediction system may parse the collected and received radar data to determine the reflectivity from the individual scans in dBZ. At 312, the system checks the reflectivity against a pre-determined and established threshold value with respect to the LB and UB height ranges on an ongoing basis.

In an embodiment, at 314 the lightning prediction system parses the reflectivity at the LB height range, and just below the LB height range, to determine if the reflectivity has decreased below 35 dBZ. If the reflectivity has not decreased below 35 dBZ the lightning prediction system determines that the lightning threat continues 316. If the reflectivity at and just below the LB height range has decreased below the 35 dBZ value, the lightning prediction system analyzes the collected radar data to determine if there has been a decrease in significant amounts of vertically integrated ice within the storm system at 318. If there has been no measurable decrease in significant amounts of vertically integrated ice the system determines that the lightning threat continues 316. If there has been a measurable decrease in significant amounts of vertically integrated ice within the storm system the lightning prediction system recalculates the probabilities of lightning formation and formulates and sends one or more users an alert of decreasing threat of lightning formation for a specified geographic area or zone. If the threat of lightning formation for a geographic area or zone has a probability at or near zero, the lightning prediction system may formulate and transmit an alert to one or more users that the geographic area or zone is clear of any lightning strike threat. This alert may be referred to as a "last strike" alert, or, alternatively, an "all clear" alert.

Figure 4:
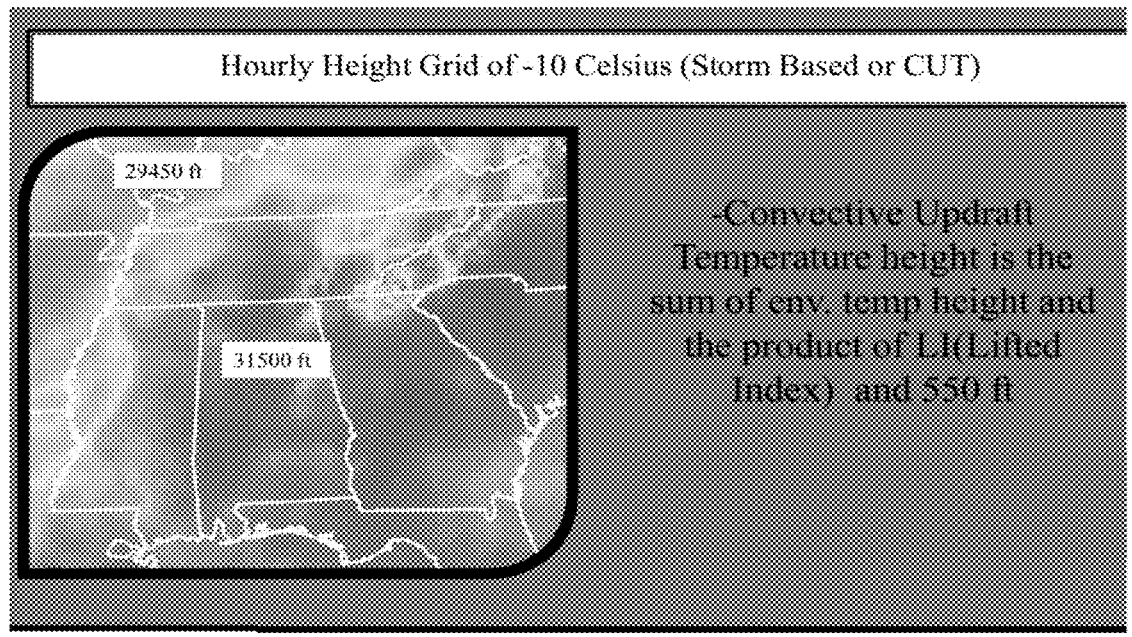
FIG. 4 is a view of the convective updraft temperature height range consistent with certain embodiments of the present invention.

Turning now to FIG. 4, this figure presents a view of the convective updraft temperature height range consistent with certain embodiments of the present invention. In an exemplary embodiment, the CUT is the sum of the environmental temperature height with the product of the Lifted Index (LI) and the Instability Constant (IC). In algorithm format this height range is calculated as: H_CUT=H_−10+(|LI|×IC). Although it must be noted that other Measured Elevated Instability index measurements may be used in the above calculation in place of the LI.

The CUT forms the upper boundary for the critical band of lightning formation within a cloud or storm system. The LB is primarily the height range where the environmental temperature is −10 Celcius. This lower limit is recognized as the base of the area of lightning formation within a thunderstorm cloud. However previous methodologies have not formulated an upper boundary for the area of lightning formation, leading to some uncertainty in actual lightning strike formation.

In an embodiment, the CUT is calculated to discover this upper boundary for the area of lightning formation. Providing an upper boundary and lower boundary for the area of lightning formation permits the calculation of the probability of lightning formation and lightning strikes to increase the confidence level on lightning formation from about 60% accuracy to above 99% accuracy.

The calculation of UB incorporates the instability in the atmosphere by including the LI in the calculation of UB. Establishing the UB parameter permits a probability calculation that incorporates the change in the structure of the UB height parameter as the storm or storm system evolves and moves from one geographic area to another over time.

Figure 5:
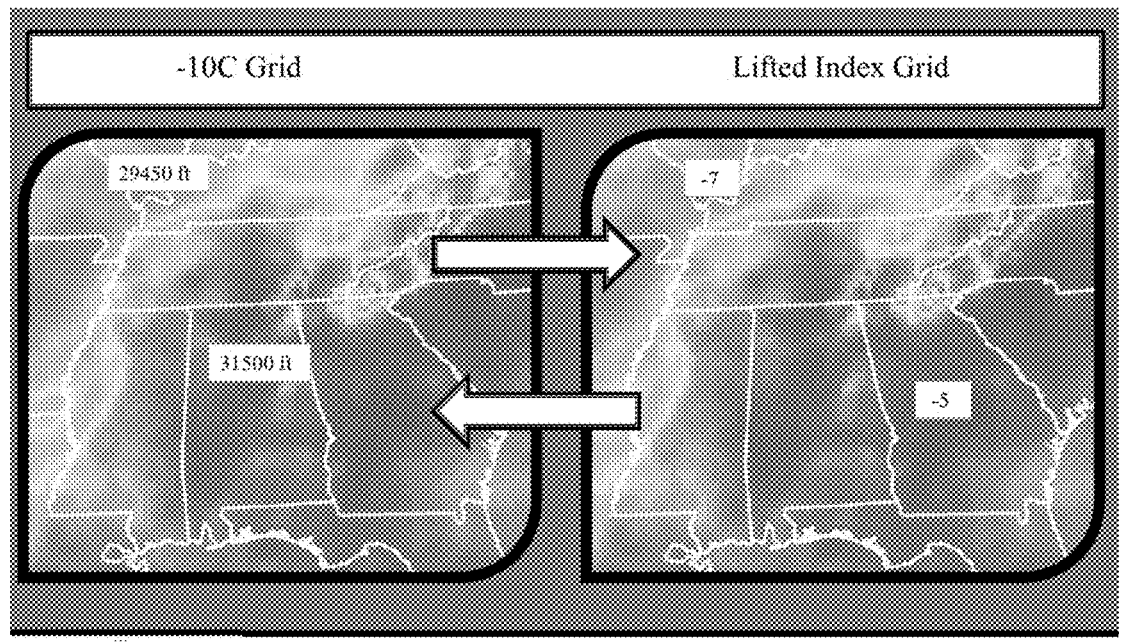
FIG. 5 is a view of the integration of an elevated instability measurement grid and the lightning temperature grid consistent with certain embodiments of the present invention.

Turning now to FIG. 5, this figure presents a non-limiting view of the integration of a Measured Elevated Instability index, such as, in a non-limiting example, a lifted index (LI), grid and the lightning temperature grid consistent with certain embodiments of the present invention. In this embodiment, the lightning prediction system combines the −10 Celsius atmospheric height grid, established as LB, and the calculated LI height grid. The combination of these height grids forms a delta of temperature between LB and UB, providing an ability to map the shape and movement of the lighting formation band within a thunderstorm or storm system.

Figure 6:
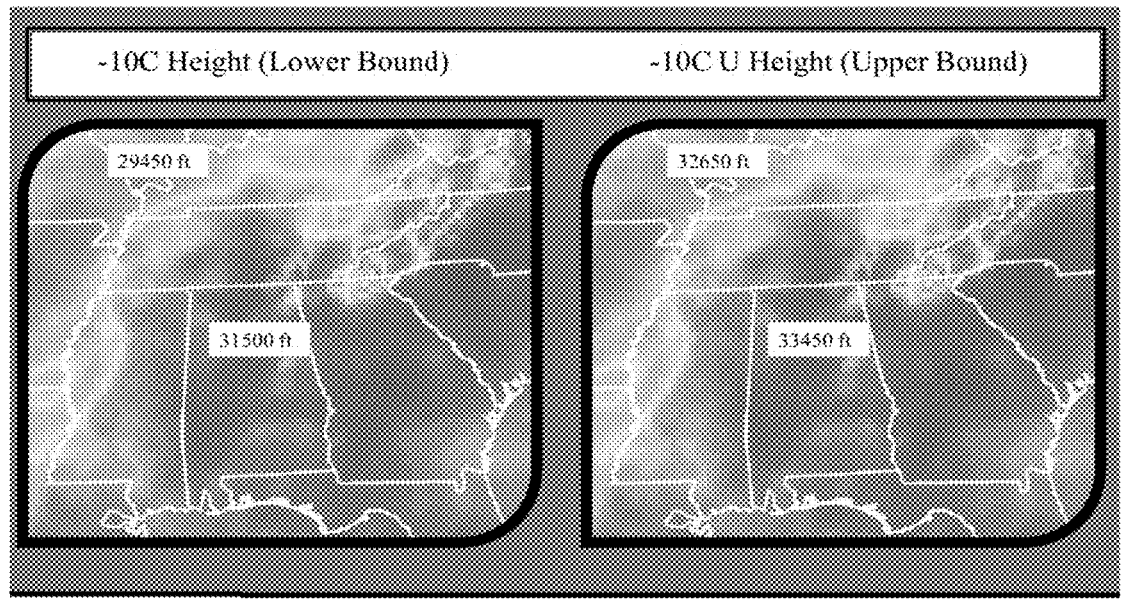
FIG. 6 is a view of the determined temperature upper bound and lower bound consistent with certain embodiments of the present invention.

Turning now to FIG. 6, this figure a view of the determined temperature upper bound (UB) and lower bound (LB) consistent with certain embodiments of the present invention. In this embodiment, the lightning prediction system provides a visual display of the calculated LB and UB heights. In a moving storm system, this information may be updated dynamically as the system evolves, providing a continuous view of the movement of the lightning formation band within the thunderstorm or storm system.

As the thunderstorm or storm system moves, the display is updated dynamically and the calculations updated to provide a prediction grid for geographic areas or zones that will experience the onset of lightning strikes. These prediction calculations are performed dynamically as the data changes to permit the system to continuously calculate the probability of lightning formation for areas ahead of the thunderstorm or storm system to permit users to receive alerts in time to evade, evacuate, or protect themselves and their property.

Equally important, the dynamic nature of the calculations permits the lightning prediction system to identify when the conditions for lightning formation have dropped to zero, or to a probability level low enough that the conditions may be considered safe for the resumption of human activity.

Figure 7:
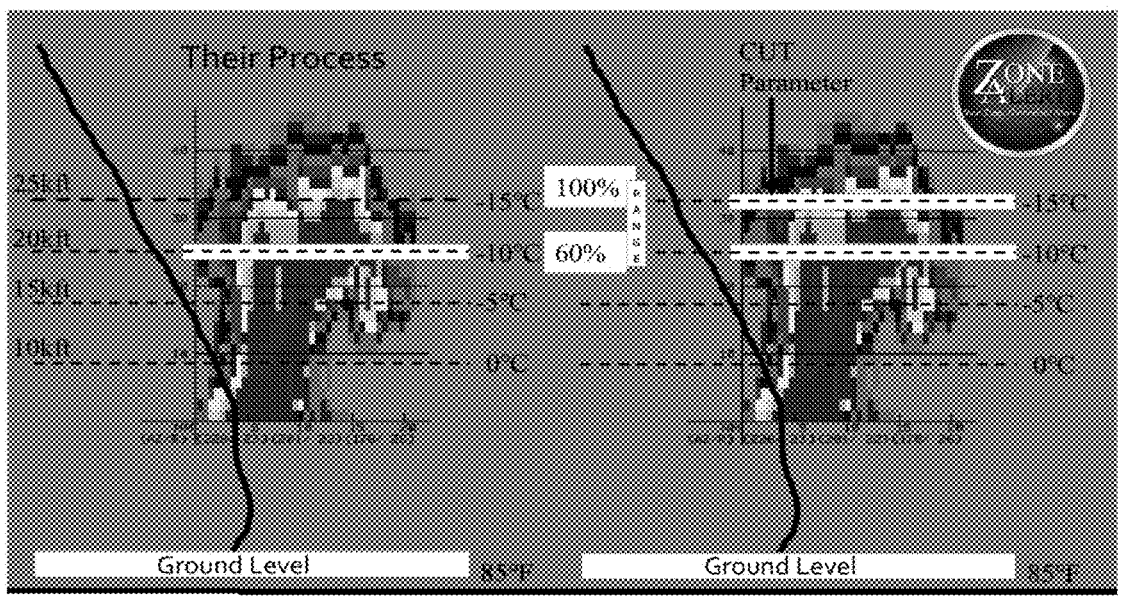
FIG. 7 is a view of the 60% to 100% lightning prediction band within a thunderstorm consistent with certain embodiments of the present invention.

Turning now to FIG. 7, this figure presents a view of the 60% to 100% lightning prediction band within a thunderstorm consistent with certain embodiments of the present invention. In this figure presents a view of known lightning formation discovery systems and the lightning prediction system. Once again, the parsing of radar and other weather information to create a map of the −10 degree Celsius height within a thunderstorm or storm system only provides the lower limit (LB) to the lightning formation range in a storm system. Lacking an upper limit to the lightning formation range, the probability calculations can only be accurate to a probability of about 60%.

Creating and mapping the height range for the upper limit (UB) permits probability calculations to be performed on a bounded range. This permits an increase in the probability calculation from about 60% to more than 99% in terms of the prediction of both the beginning and cessation of lightning formation for a geographic area or zone for a particular time.

While certain illustrative embodiments have been described, it is evident that many alternatives, modifications, permutations and variations will become apparent to those skilled in the art in light of the foregoing description.

What is claimed is:

1. A system for predicting lightning, comprising:
a device having a processor, display and user input capability;
receiving at said device a user defined area of concern for lightning strike activity;
the device collecting vertical temperature data for said defined area of concern from one or more weather temperature models;
said device operable to calculate the lightning formation critical lower bound height and critical upper bound height;
calculating a critical updraft temperature height by utilizing pre-determined instability parameters to determine the critical updraft temperature height within a storm cloud and setting the calculated critical updraft temperature height as the critical upper bound height;
receiving at said device radar reflectivity data for said defined area of concern;
parsing radar reflectivity from individual radar reflectivity scan data;
associating parsed radar reflectivity with said lower bound height and said upper bound height;
compare the parsed radar reflectivity associated with said lower bound height and said upper bound height against a pre-set lighting strike threshold value;
when the pre-set lightning strike threshold value is exceeded, formatting at least a lightning strike warning and time until strike warning for said defined area of concern to at least one user;
said device transmitting said lightning strike warning and said time until strike warning to the at least one user.

2. The system of claim 1, where the lower bound height is associated with the height of environment where the temperature is at or below −10 degrees Celsius.

3. The system of claim 1, where the upper bound height of the critical temperature updraft within a developing storm cloud is defined as a convective updraft temperature (CUT) height and reflectivity associated with said convective updraft is above a pre-determined threshold level.

4. The system of claim 3, where the parsed radar reflectivity is measured in dBZ and the lighting strike threshold value associated with said critical lower bound height and said critical upper bound height is at or above 40 dBZ or the lightning strike threshold just below said critical lower bound height is at or above 45 dBZ.

5. The system of claim 1, where the lightning strike warning is a warning that lightning strike activity will begin.

6. The system of claim 1, where the lightning strike warning is a message indicating that lightning strike activity will cease.

7. The system of claim 1, where the lightning strike warning also includes a probability associated with said time until strike warning, where the probability of a lightning strike changes in inverse proportion to the length of time remaining in said time until strike warning.

8. The system of claim 1, where the time until strike warning includes an indication of whether the time until strike is the time until lightning strikes begin or the time until lightning strikes cease for the user defined area of concern.

9. The system of claim 1, where the at least one user is one or more individuals, a private subscription service, a local government entity, and/or emergency response entities.

10. The system of claim 1, where the lightning strike warning comprises a lightning strike begins message, a lightning strike threat continues message, and/or a lightning strike threat cessation message.

11. A method for predicting lightning, comprising:
receiving a user defined area of concern for lightning strike activity;
collecting vertical temperature data for said defined area of concern from one or more weather temperature models;
calculating the lightning formation critical lower bound height and critical upper bound height;
calculating a critical updraft temperature height by utilizing pre-determined instability parameters to determine the critical updraft temperature height within a storm cloud and setting the calculated critical updraft temperature height as the critical upper bound height;
receiving at said device radar reflectivity data for said defined area of concern;
parsing radar reflectivity from individual radar reflectivity scan data;
associating parsed radar reflectivity with said lower bound height and said upper bound height;
comparing the parsed radar reflectivity associated with said lower bound height and said upper bound height against a pre-set lighting strike threshold value;
formatting at least a lightning strike warning and time until strike warning if the lightning strike threshold value is exceeded for said defined area of concern to at least one user;
transmitting said lightning strike warning and said time until strike warning to the at least one user.

12. The method of claim 11, where said critical lower bound height is associated with the height of environment where the temperature is at or below −10 degrees Celsius.

13. The method of claim 11, where said critical upper bound height of the critical temperature updraft within a developing storm cloud is defined as a convective updraft temperature (CUT) height and reflectivity associated with said convective updraft is above a pre-determined threshold level.

14. The method of claim 13, where the parsed radar reflectivity is measured in dBZ and the lighting strike threshold value associated with said critical lower bound height and said critical upper bound height is at or above 40 dBZ or the lightning strike threshold just below said critical lower bound height is at or above 45 dBZ.

15. The method of claim 11, where the lightning strike warning is a warning that lightning strike activity will begin.

16. The method of claim 11, where the lightning strike warning is a message indicating that lightning strike activity will cease.

17. The method of claim 11, where the lightning strike warning also includes a probability associated with said time until strike warning, where the probability of a lightning strike changes in inverse proportion to the length of time remaining in said time until strike warning.

18. The method of claim 11, where the time until strike warning includes an indication of whether the time until strike is the time until lightning strikes begin or the time until lightning strikes cease for the user defined area of concern.

19. The method of claim 11, where the at least one user is one or more individuals, a private subscription service, a local government entity, and/or emergency response entities.

20. The method of claim 11, where the lightning strike warning comprises a lightning strike begins message, a lightning strike threat continues message, and/or a lightning strike threat cessation message.

* * * * *